United States Patent
Tsai et al.

(10) Patent No.: US 11,161,288 B2
(45) Date of Patent: Nov. 2, 2021

(54) WATERPROOF GASKET STRUCTURE AND GASKET SHAPING MOLD THEREOF

(71) Applicant: DELTA ELECTRONICS, INC., Taoyuan (TW)

(72) Inventors: Tsung-Han Tsai, Taoyuan (TW); Yao-Chien Lin, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 379 days.

(21) Appl. No.: 16/110,461

(22) Filed: Aug. 23, 2018

(65) Prior Publication Data

US 2019/0202098 A1    Jul. 4, 2019

(30) Foreign Application Priority Data

Dec. 29, 2017  (CN) .......................... 201711476666.4

(51) Int. Cl.
| | |
|---|---|
| B29C 45/26 | (2006.01) |
| F16J 15/02 | (2006.01) |
| F16J 15/10 | (2006.01) |
| B29C 39/26 | (2006.01) |
| B29C 33/42 | (2006.01) |

(Continued)

(52) U.S. Cl.
CPC .......... B29C 45/26 (2013.01); B29C 33/0022 (2013.01); B29C 33/42 (2013.01);
(Continued)

(58) Field of Classification Search
CPC ......... B33Y 30/00; B29C 45/26; B29C 39/26; B29C 39/026; B29C 33/42; B29C 33/022; B29C 2045/2683; B29L 2031/265
See application file for complete search history.

(56) References Cited

U.S. PATENT DOCUMENTS

| | | | | |
|---|---|---|---|---|
| 4,990,396 A | * | 2/1991 | Belter ................. | B29C 37/0082 |
| | | | | 264/271.1 |
| 5,137,674 A | * | 8/1992 | Braconier ............... | B29C 45/14 |
| | | | | 264/160 |

(Continued)

FOREIGN PATENT DOCUMENTS

| | | |
|---|---|---|
| CN | 1138212 A | 12/1996 |
| CN | 101443173 A | 5/2009 |

(Continued)

*Primary Examiner* — Nahida Sultana
*Assistant Examiner* — Margaret B Hayes
(74) *Attorney, Agent, or Firm* — Muncy, Geissler, Olds & Lowe, P.C.

(57) ABSTRACT

A waterproof gasket structure and its gasket shaping mold are provided. The gasket shaping mold includes a mold seat having a surface, and plural mold cavity ring-grooves concavely formed on the surface, each having two corresponding longitudinal groove sections. At least one longitudinal groove section has one or more inwardly bent wavy bent portions, and plural turning round corner portions are formed at the junction between the longitudinal groove section and the wavy bent portion, and each turning round corner portion has a radius equal to or greater than 6 mm. Therefore, the middle of the mold cavity ring-groove can be utilized effectively, and plural waterproof gaskets can be manufactured by the same gasket shaping mold while achieving the effects of reducing the mold volume, improving the manufacturing efficiency, and saving the manufacturing cost.

7 Claims, 7 Drawing Sheets

(51) Int. Cl.
  *B29C 33/00*   (2006.01)
  *B29C 39/02*   (2006.01)
  *B29L 31/26*   (2006.01)

(52) U.S. Cl.
  CPC ............ *B29C 39/026* (2013.01); *B29C 39/26* (2013.01); *F16J 15/022* (2013.01); *F16J 15/106* (2013.01); *F16J 15/108* (2013.01); *B29C 2045/2683* (2013.01); *B29L 2031/265* (2013.01)

(56) References Cited

U.S. PATENT DOCUMENTS

| | | | |
|---|---|---|---|
| 6,478,570 B1* | 11/2002 | Suga | B29C 45/2642 425/552 |
| 8,419,992 B2* | 4/2013 | Asai | B29C 45/2616 264/219 |
| 2006/0057245 A1* | 3/2006 | Haupt | B29C 45/2628 425/589 |
| 2007/0071846 A1* | 3/2007 | Xue | B29C 45/2725 425/572 |
| 2014/0147547 A1* | 5/2014 | Ueno | B29C 45/33 425/556 |
| 2016/0303772 A1 | 10/2016 | Umezaki et al. | |

FOREIGN PATENT DOCUMENTS

| | | |
|---|---|---|
| CN | 201685380 U | 12/2010 |
| CN | 105793007 A | 7/2016 |
| JP | 2015-100963 A | 6/2015 |
| JP | 2016-065635 A | 4/2016 |

\* cited by examiner

WATERPROOF GASKET STRUCTURE AND GASKET SHAPING MOLD THEREOF

FIELD OF THE INVENTION

This disclosure relates to a waterproof gasket structure and its mold, and more particularly to the waterproof gasket structure and its gasket shaping mold.

BACKGROUND OF THE INVENTION

In general, a waterproof gasket structure is mainly filled into an assembling joint of a product in order to fill up the gap of the assembling joint and prevent external water vapor or water drops from entering into the product through the assembling joint. At present, most manufacturers use a mold with an O-shaped mold cavity or a square shaped mold cavity to manufacture the waterproof gasket structure by an injection molding method.

However, the aforementioned mold with the O-shaped mold cavity or square shaped mold cavity has the following issues. Since the middle of the O-shaped mold cavity or square shaped mold cavity is usually not utilized effectively or even idled, it is necessary to increase the size of the mold for the manufacture of a plurality of waterproof gasket structures, and the volume of the mold will become too large or the same mold has to be manufactured repeatedly for several times. As a result, the manufacturing time and cost are increased.

In view of the aforementioned drawbacks of the prior art, the discloser of this disclosure based on years of experience to conduct extensive research and experiment, and finally provided a feasible solution to overcome the drawbacks of the prior art.

SUMMARY OF THE INVENTION

Therefore, it is a primary objective of this disclosure to provide a waterproof gasket structure and its gasket shaping mold that can utilize the middle of a gasket body and a mold cavity ring-groove effectively to manufacture a plurality of waterproof gaskets by the same gasket shaping mold while achieving the effects of reducing the mold volume, improving the manufacturing efficiency, and saving the manufacturing cost.

To achieve the aforementioned and other objectives, this disclosure provides a waterproof gasket structure, comprising: a gasket body, having two longitudinal side strips configured to be opposite to each other; at least one of the longitudinal side strips having at least an inwardly bent wavy curved section; and a plurality of turning round corners formed at the junction between the longitudinal side strip and the wavy curved section, wherein each of the turning round corners has a radius equal to or greater than 6 mm.

In an embodiment of this disclosure, this disclosure provides a gasket shaping mold, comprising: a mold seat, having a surface, a plurality of mold cavity ring-grooves concavely formed on the surface, each of the mold cavity ring-grooves having two longitudinal groove sections configured to be opposite to each other, and at least one of the longitudinal groove sections having at least an inwardly bent wavy bent portion, and a plurality of turning round corner portions formed at the junction between the longitudinal groove section and the wavy bent portion, and each of the turning round corner portions (132) having a radius equal to or greater than 6 mm.

According to the description above, each of the turning round corner portions and bent round corner portions at the junction and the corner-end round corner portion at the corner end of the mold cavity ring-groove has a radius equal to or greater than 6 mm, so that each of the turning round corners and bent round corners at the junction and the corner-end round corner at the corner end of the gasket body has a radius equal to or greater than 6 mm. When the gasket body is expanded and used, and both of the junction and corner end of the gasket body are round corners, the gasket body will not be cracked or damaged easily (compared with the right angle), so as to improve the service life of the gasket body.

According to the description above, each of the mold cavity ring-grooves has an inwardly bent wavy bent portion, and the wavy bent portion has a wave height greater than one-quarter of the separation distance between the two longitudinal groove sections, and the gasket body is manufactured from a single mold cavity ring-groove by casting, so that the gasket body has an inwardly bent wavy curved section formed and configured to be corresponsive to the mold cavity ring-groove, and the wavy curved section has a wave height greater than one-quarter of the separation distance between the two longitudinal side strips, so that the middle of the gasket body and the mold cavity ring-groove can be utilized effectively to achieve the effect of reducing the mold volume, and the mold cavity ring-grooves may be arranged in parallel to each other on the same gasket shaping mold, so that a plurality of waterproof gasket structures can be manufactured by the same gasket shaping mold to achieve the effects of improving the manufacturing efficiency and saving the manufacturing cost.

According to the description above, the length and size of the gasket body may be adjusted by increasing or decreasing the wave number of the wavy bent portion of the mold cavity ring-groove and the quantity of the concavely bent portions without changing the area of the single mold cavity ring-groove occupied on the surface of the mold seat. Regardless of the manufacture of different sized waterproof gasket structures 20, the gasket shaping mold 10 still has the advantages of maintaining the same volume and producing the same quantity of products.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

With reference to FIGS. 1 to 4 for a waterproof gasket structure and its gasket shaping mold in accordance with this disclosure, the gasket shaping mold 10 comprises a mold seat 1, and the waterproof gasket structure 20 comprises a gasket body 2.

Figure 1:
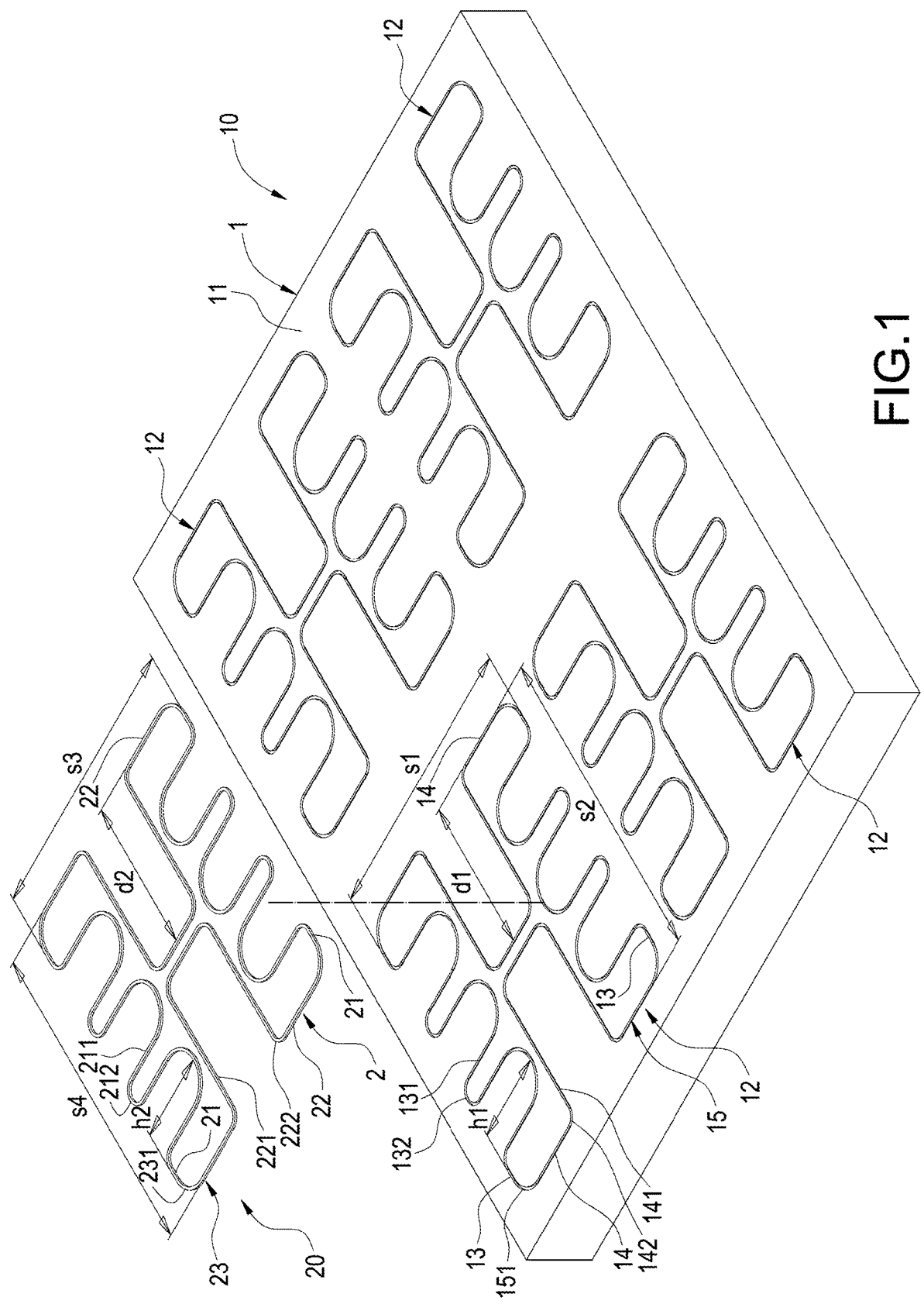
FIG. 1 is a schematic view of removing a waterproof gasket structure from a gasket shaping mold in accordance with a first embodiment of this disclosure.
Figure 2:
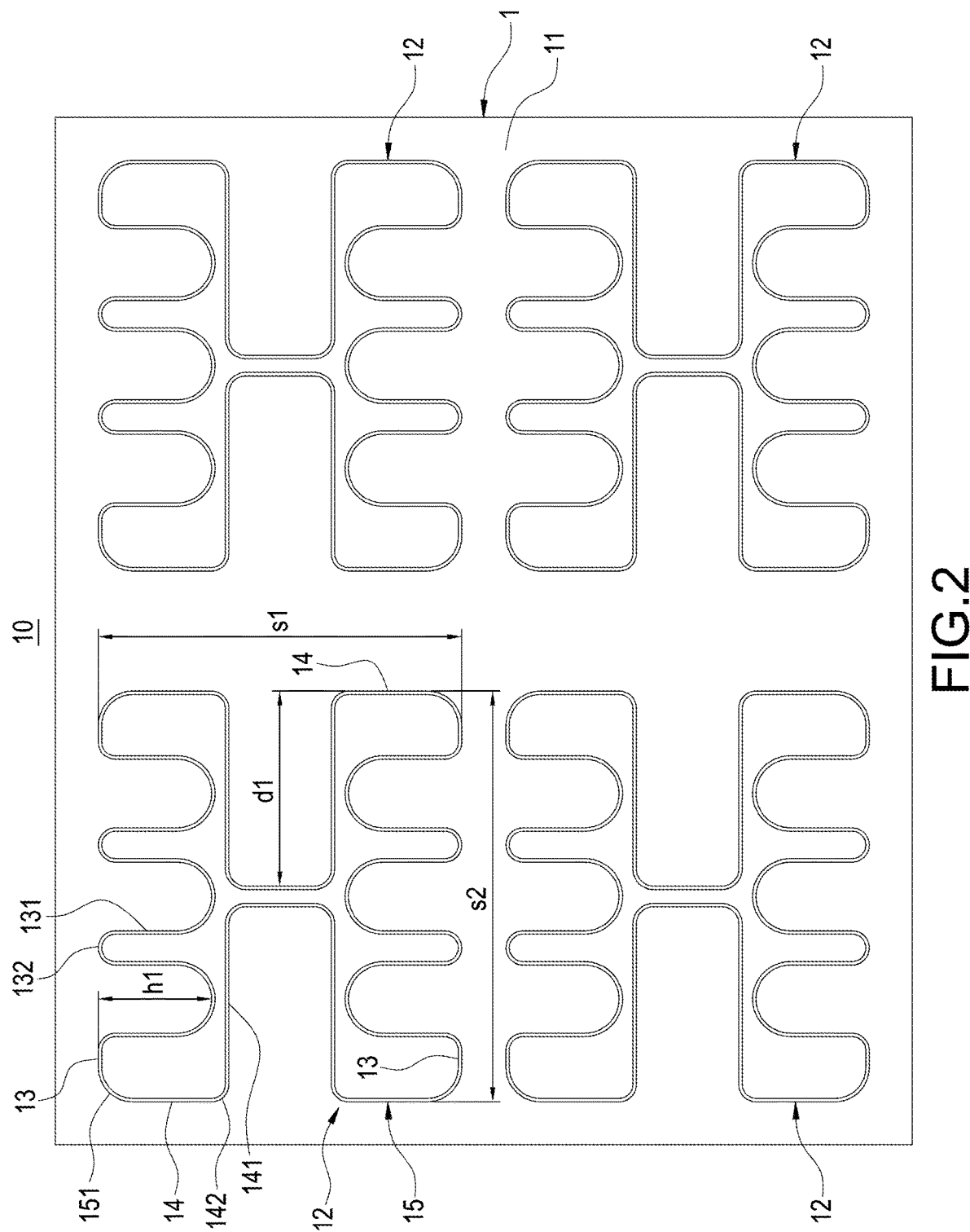
FIG. 2 is a top view of a gasket shaping mold in accordance with the first embodiment of this disclosure.

In FIGS. 1 and 2, the mold seat 1 has a surface 11, a plurality of mold cavity ring-grooves 12 concavely formed on the surface 11, and each mold cavity ring-groove 12 having two longitudinal groove sections 13 configured to be opposite to each other, at least a longitudinal groove section 13 having one or more inwardly bent wavy bent portions 131, and a plurality of turning round corner portions 132 formed at the junction between the longitudinal groove section 13 and the wavy bent portion 131, and each turning round corner portion 132 having a radius equal to or greater than 6 mm.

Specifically, there are two longitudinal groove sections 13 having the wavy bent portion 131, and each mold cavity ring-groove 12 has two transverse groove sections 14 spanned across the two longitudinal groove sections 13 and configured to be opposite to each other, and each transverse groove section 14 has one or more concavely bent portions 141 inwardly bent and disposed between the two wavy bent portions 131, and a plurality of bent round corner portions 142 is formed at the junction between the transverse groove section 14 and the concavely bent portion 141, and each bent round corner portion 142 has a radius equal to or greater than 6 mm.

In addition, there are two (n1) concavely bent portions 141 arranged from top to bottom between the two transverse groove sections 14, and the better the two (n1) upper and lower concavely bent portion 141 distributed at the separation distance s2 of the two transverse groove sections 14, the more the mold cavity ring-grooves 12 disposable on the surface 11 of the mold seat 1. Therefore, the depth of the concavely bent portion 141 must be at least greater than one-third (n1+1) of the separation distance s2 of the two transverse groove sections 14, and this is a preferred implementation of this embodiment.

In addition, there are three elements (n2) respectively the wavy bent portion 131, the concave bent portion 141, and the wavy bent portion 131 arranged from left to right between the two longitudinal groove sections 13. The better the wavy bent portion 131, the concave bent portion 141, and the wavy bent portion 131 arranged from left to right between the two longitudinal groove sections 13 and distributed at the separation distance s1 of the two longitudinal groove sections 13, the more mold cavity ring-grooves 12 disposable on the surface 11 of the mold seat 1. Therefore, wave height h1 of the wavy bent portion 131 must be at least greater than one-quarter (n2+1) of the separation distance s1 of the two longitudinal groove sections 13, and this is a preferred implementation of this embodiment.

Wherein, the wavy bent portion 131 of this embodiment has a shape of a U-shaped wave, and the concavely bent portion 141 is flat u-shaped, but this disclosure is not limited to such arrangement only. The wavy bent portion 131 has a shape of a U-shaped wave, a V-shaped wave, or a flat u-shaped wave, and the concavely bent portion 141 may be U-shaped, V-shaped, or flat u-shaped.

In addition, each mold cavity ring-groove 12 is a polygonal ring-groove 15, and a plurality of corner-end round corner portions 151 is formed at a corner end of the polygonal ring-groove 15, and each corner-end round corner portion 151 has a radius equal to or greater than 6 mm.

Figure 3:
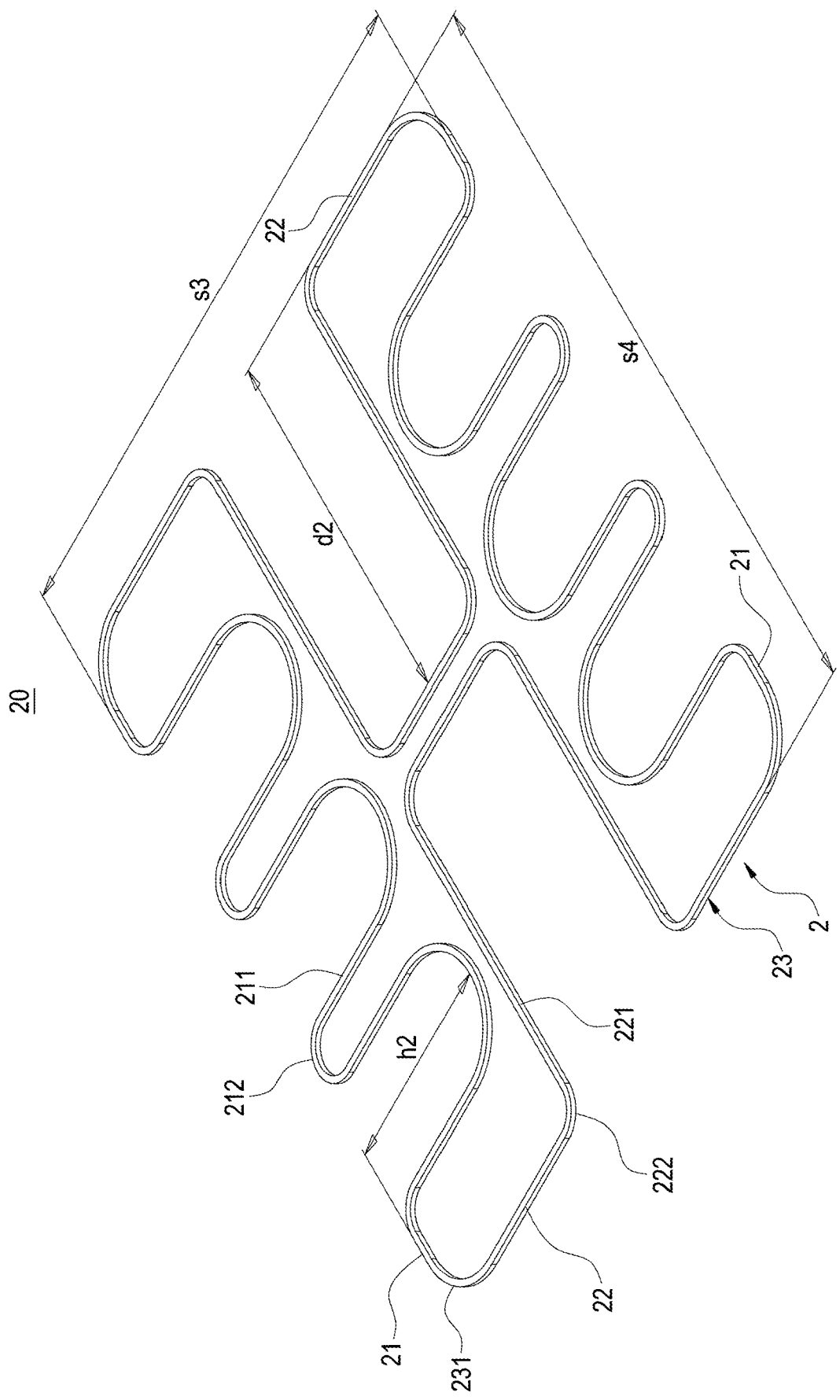
FIG. 3 is a perspective view of a waterproof gasket structure in accordance with the first embodiment of this disclosure.

In FIGS. 1 and 3, the gasket body 2 is manufactured from a single mold cavity ring-groove 12 by casting, and the gasket body 2 is made of a silicone or rubber material with the elastic and waterproof functions. The gasket body 2 has two longitudinal side strips 21 configured to be opposite to each other, and at least one of the longitudinal side strips 21 has an inwardly bent wavy curved section 211, and a plurality of turning round corners 212 formed at the junction between the longitudinal side strip 21 and the wavy curved section 211, and each turning round corner 212 has a radius equal to or greater than 6 mm.

Further, there are two longitudinal side strips 21 having the wavy curved section 211, and each gasket body 2 has two transverse side strips 22 formed and spanned across the two longitudinal side strips 21 and configured to be opposite to each other, and each transverse side strip 22 has one or more inwardly concavely bent sections 221 disposed between the two wavy curved sections 211, and a plurality of bent round corners 222 formed at the junction between the transverse side strip 22 and the inwardly concavely bent section 221, and each bent round corner 222 has a radius equal to or greater than 6 mm.

Since there are two (n3) inwardly concavely bent sections 221 arranged from top to bottom between the two transverse side strips 22, and the better the two (n3) upper and lower inwardly concavely bent sections 221 distributed at the separation distance s4 of the two transverse side strips 22, the smaller the required manufacturing area of the gasket body 2, therefore the depth d2 of the inwardly concavely bent section 221 must be at least greater than one-third (n3+1) of the separation distance s4 between the two transverse side strips 22, and this is a preferred implementation of this embodiment.

In addition, there are three (n4) elements, respectively: the wavy curved section 211, the inwardly concavely bent section 221, and the wavy curved section 211 arranged from left to right between the two longitudinal side strips 21. Since the better the wavy curved section 211, the inwardly concavely bent section 221, and the wavy curved section 211 arranged from left to right between the two longitudinal side strips 21 disposed at the separation distance s3 of the two longitudinal side strips 21, the smaller the required manufacturing area of the gasket body 2, therefore the wave height h2 of the wavy curved section 211 must be at least greater than one-quarter (n4+1) of the separation distance s3 of the two longitudinal side strips 21, and this is a preferred implementation of this embodiment.

Wherein, the wavy curved section 211 of this embodiment has a shape of a U-shaped wave, and the inwardly concavely bent section 221 is flat u-shaped, but this disclosure is not limited to such arrangements. The wavy curved section 211 may be in the shape of a U-shaped wave, a V-shaped wave or a flat u-shaped wave, and the inwardly concavely bent section 221 may be U-shaped, V-shaped or flat u-shaped.

In addition, the gasket body 2 is a polygonal gasket 23, and a corner end of the polygonal gasket 23 has a plurality of corner-end round corners 231, and each corner-end round corner 231 has a radius equal to or greater than 6 mm.

With reference to FIGS. 1 to 3 for the using status of a gasket shaping mold 10 and a waterproof gasket structure 20 in accordance with this disclosure, each mold cavity ring-groove 12 has an inwardly bent wavy bent portion 131, and the gasket body 2 is manufactured from a single mold cavity ring-groove 12 by casting, so that the gasket body 2 has an inwardly bent wavy curved section 211 configured to be corresponsive to the mold cavity ring-groove 12, and the mold cavity ring-grooves 12 are arranged parallel to each other on the same gasket shaping mold 10. Therefore, the same gasket shaping mold 10 may produce a plurality of waterproof gasket structures 20 at a time to achieve the effects of improving the manufacturing efficiency and saving the manufacturing cost.

In addition, each of the turning round corner portions 132 and bent round corner portions 142 at the junction and the corner-end round corner portion 151 at the corner end of the mold cavity ring-grooves 12 has a radius equal to or greater than 6 mm, so that each of the turning round corners 212 and bent round corners 222 at the junction and the corner-end round corner 231 at the corner end of the gasket body 2 has a radius equal to or greater than 6 mm, so that when the gasket body 2 is expanded and used and the junction and corner end of the gasket body 2 are round corners, the gasket body 2 will not be broken or damaged easily (compared with the right angle), so as to improve the service life of the gasket body 2.

In addition, the wavy bent portion 131 has a wave height h1 greater than one-quarter of the separation distance s1 of the two longitudinal groove sections 13, and the concavely bent portion 141 has a depth d1 greater than one-third of the separation distance s2 of the two transverse groove sections 14, and the wavy curved section 211 has a wave height h2 greater than one-quarter of the separation distance s3 of the two longitudinal side strips 21, and the inwardly concavely bent section 221 has a depth d2 greater than one-third of the separation distance s4 of the two transverse side strips 22, so that the middle of the gasket body 1 and the mold cavity ring-groove 12 can be utilized effectively to achieve the effect of reducing the mold volume.

Therefore, the length and size of the gasket body 2 can be adjusted by increasing or decreasing the wave number of the wavy bent portion 131 of the mold cavity ring-groove 12 and the quantity of the concavely bent portions 141 without changing the area of the single mold cavity ring-groove 12 occupied on the surface 11 of the mold seat 1. Regardless of the manufacture of different sized waterproof gasket structures 20, the gasket shaping mold 10 still has the advantages of maintaining the same volume and producing the same quantity of products.

Figure 4:
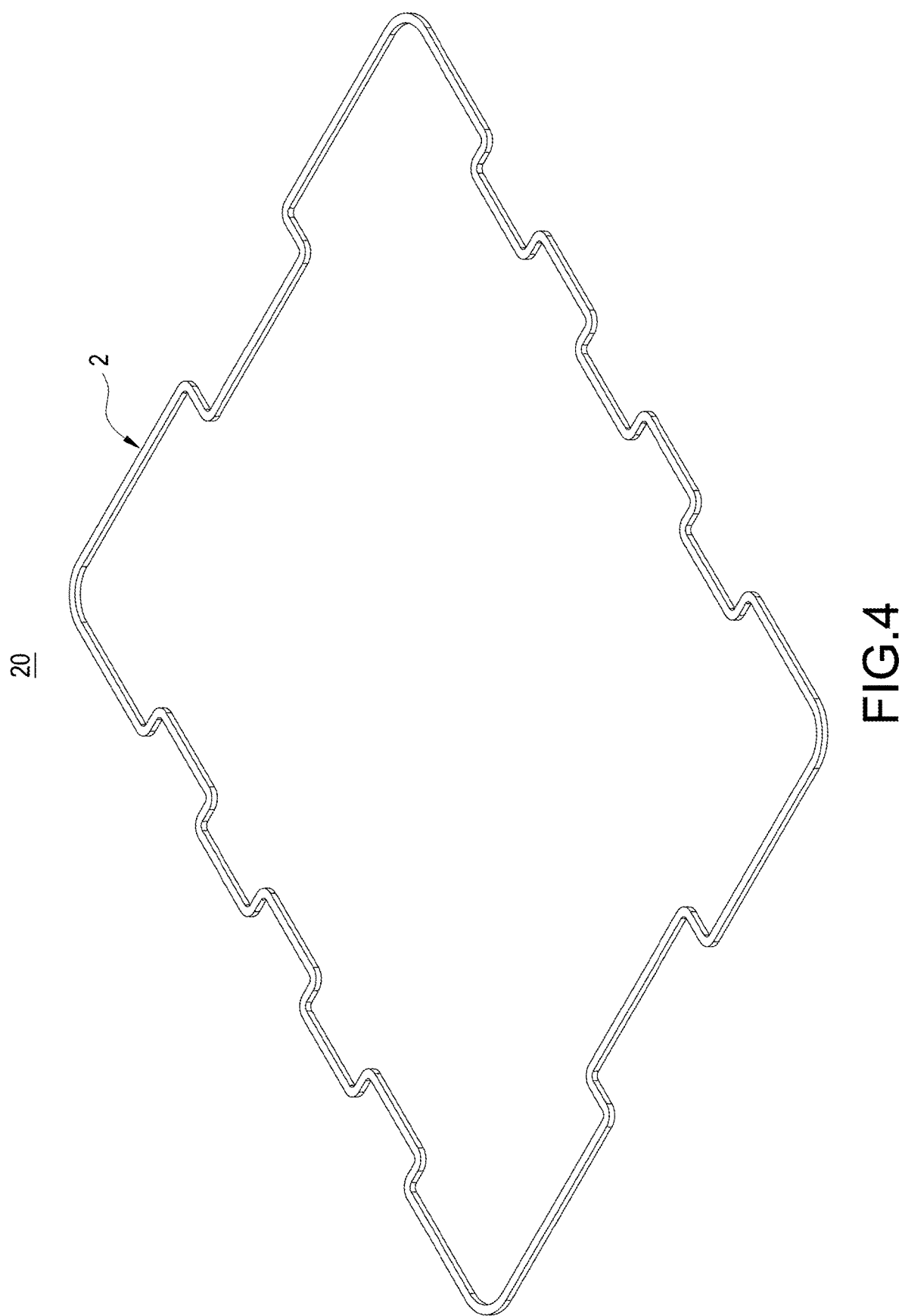
FIG. 4 is a schematic view of expanding a waterproof gasket structure by an external force in accordance with the first embodiment of this disclosure.

With reference to FIG. 4 for a schematic view of expanding a waterproof gasket structure 20 by an external force in accordance with this disclosure, the external force is applied to expand the gasket body 2 of FIG. 3 (wherein no external force has been applied to the waterproof gasket structure 20 as shown in FIG. 3 yet). Although the gasket body 2 is in an irregular shape, the gasket body 2 is elastic, so that when the gasket body 2 is filled into the assembling joint of a product, the gasket body 2 will be elastically deformed to fill up the gap of the assembling joint, and the waterproof effect will not be affected by the irregular shape of the gasket body 2.

Figure 5:
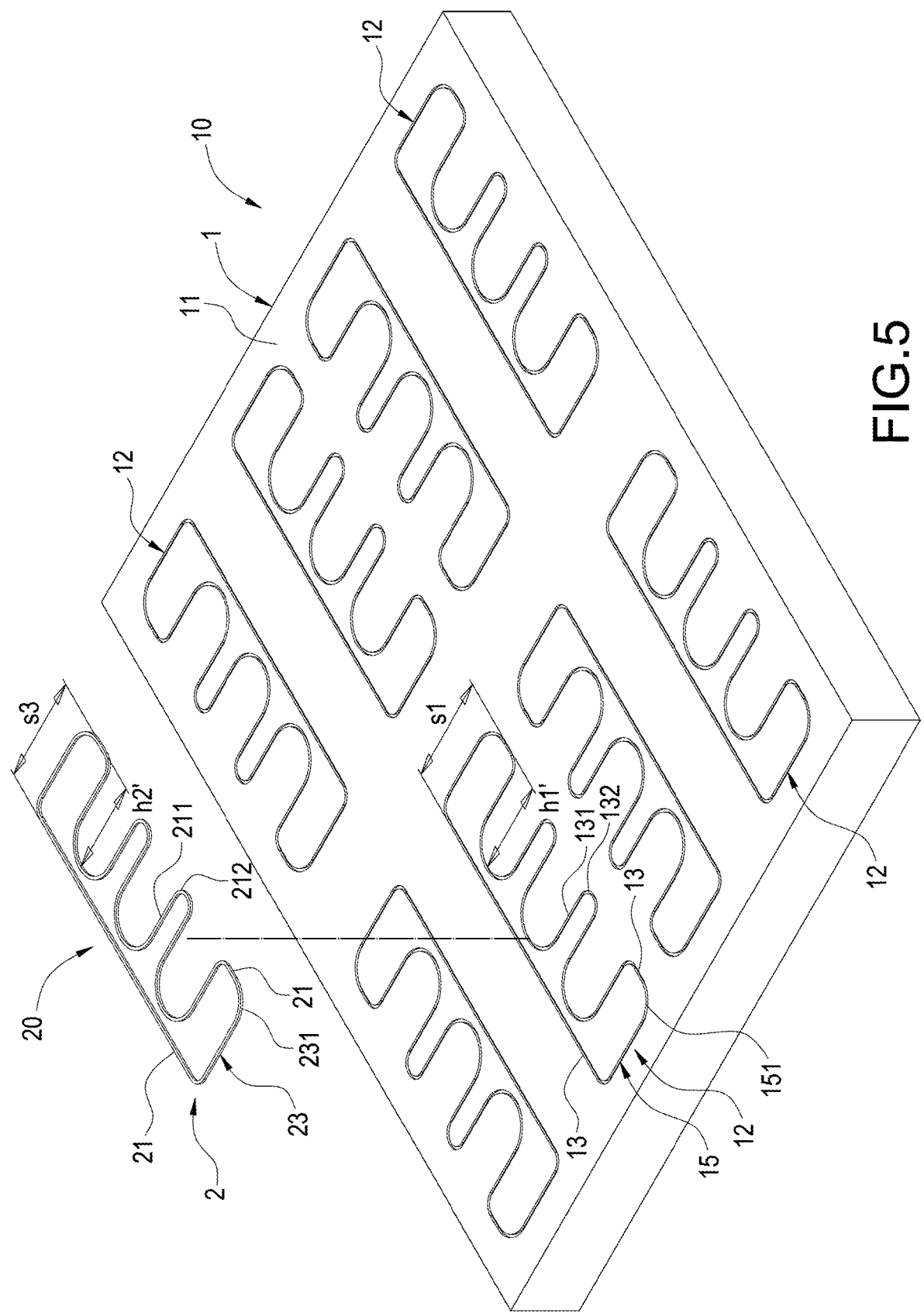
FIG. 5 is a schematic view of removing a waterproof gasket structure from a gasket shaping mold in accordance with a second embodiment of this disclosure.

With reference to FIG. 5 for a gasket shaping mold 10 and a waterproof gasket structure 20 in accordance with the second embodiment of this disclosure, the second embodiment is substantially the same as the first embodiment, except that each mold cavity ring-groove 12 of the second embodiment just has two longitudinal groove sections 13, and there is only one longitudinal groove section 13 having the wavy bent portion 131.

Specifically, each mold cavity ring-groove 12 just has two longitudinal groove sections 13, and each mold cavity ring-groove 12 just has one longitudinal groove section 13 with the wavy bent portion 131. The better the wavy bent portions 131 distributed at the separation distance s1 of the two longitudinal groove sections 13, the more mold cavity ring-grooves 12 disposable on the surface 11 of the mold seat 1, so that the wave height h1' of the wavy bent portion 131 must be at least greater than two-thirds of the separation distance s1 of the two longitudinal groove sections 13, and more wavy bent portions 131 can be distributed at the separation distance s1 of the two longitudinal groove sections 13, and this is a preferred implementation of this embodiment. The gasket body 2 is manufactured from a single mold cavity ring-groove 12 by casting, so that the gasket body 2 just has one longitudinal side strip 21 with the wavy curved section 211, and the wave height h2' of the wavy curved section 211 is greater than two-thirds of the separation distance s3 of the two longitudinal side strips 21, and this is a preferred implementation of this embodiment, and the middle of the gasket body 1 and the mold cavity ring-groove 12 can be utilized effectively. Therefore, the shape, length, and size of the gasket body 2 of the second embodiment are different from those of the first embodiment only, and the second embodiment has the same functions and effects of the first embodiment.

Figure 6:
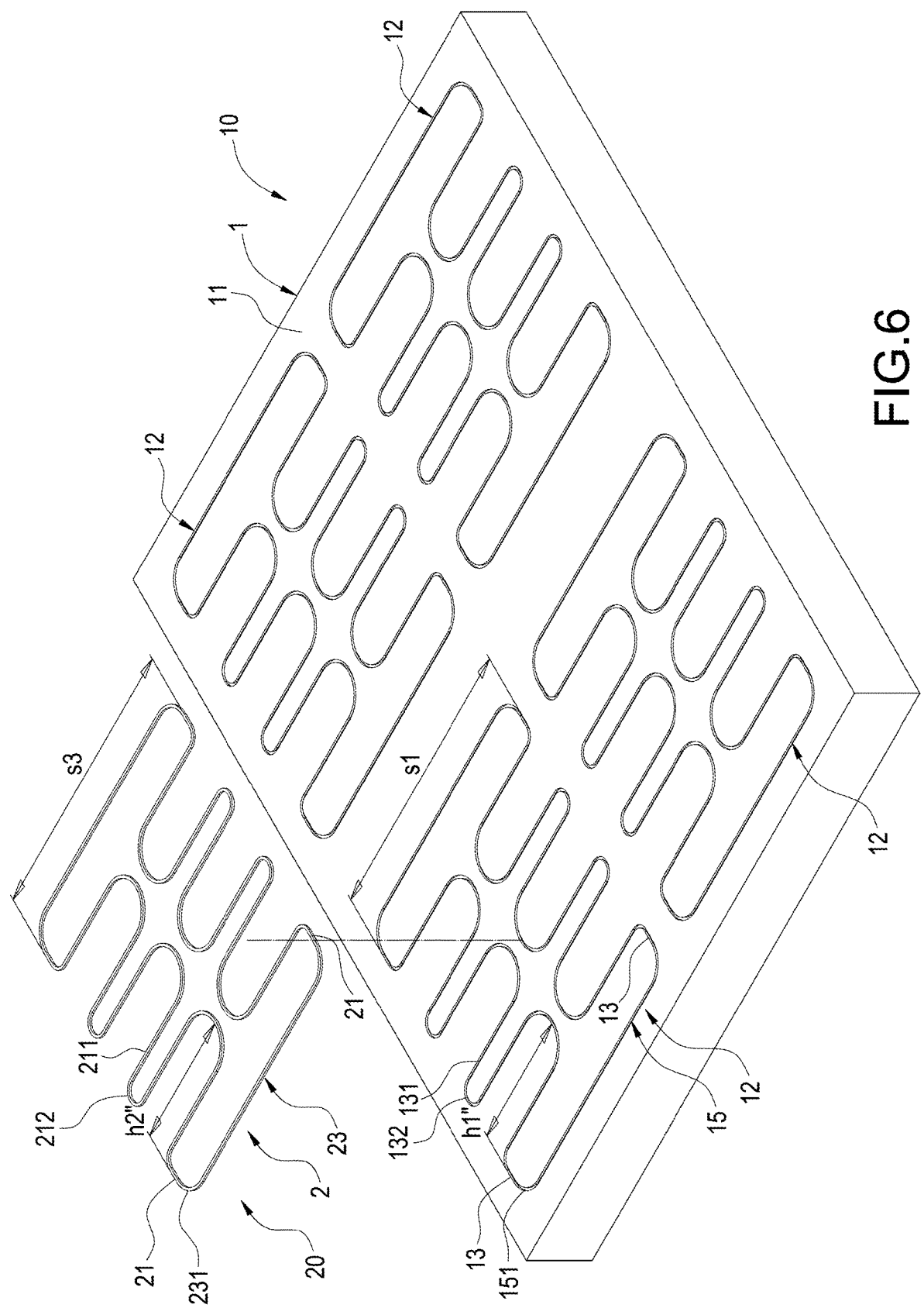
FIG. 6 is a schematic view of removing a waterproof gasket structure from a gasket shaping mold in accordance with a third embodiment of this disclosure.

With reference to FIG. 6 for a gasket shaping mold 10 and a waterproof gasket structure 20 in accordance with the third embodiment of this disclosure, the third embodiment is substantially the same as the first embodiment, except that each mold cavity ring-groove 12 of the third embodiment just has two longitudinal groove sections 13.

Further, each mold cavity ring-groove 12 just has two longitudinal groove sections 13, and each longitudinal groove section 13 has a wavy bent portion 131, two wavy bent portions 131 arranged from left to right between the two longitudinal groove sections 13. The better the left and right wavy bent portions 131 distributed at the separation distance s1 of the two longitudinal groove sections 13, the more mold cavity ring-groove 12 disposable on the surface 11 of the mold seat 1, so that the wave height h1" of each wavy bent portion 131 must be at least greater than one-third of the separation distance s1 of the two longitudinal groove sections 13. The two wavy bent portions 131 can be distributed fully in the separation distance s1 of the two longitudinal groove sections 13, and this is a preferred implementation of this embodiment. The gasket body 2 is manufactured from a single mold cavity ring-groove 12 by casting, so that the gasket body 2 just has two longitudinal side strips 21, and the gasket body 2 has two longitudinal side strips 21 with the wavy curved section 211, wherein each wavy curved section 211 has a wave height h2" greater than one-third of the separation distance s3 of the two longitudinal side strips 21, and this is a preferred implementation of this embodiment, so that the middle of the gasket body 1 and the mold cavity ring-groove 12 can be utilized effectively. Therefore, the gasket body 2 of the third embodiment and the gasket body 2 of the first embodiment are just different in shape, length, and size, and the third embodiment has the same functions and effects of the first embodiment.

Figure 7:
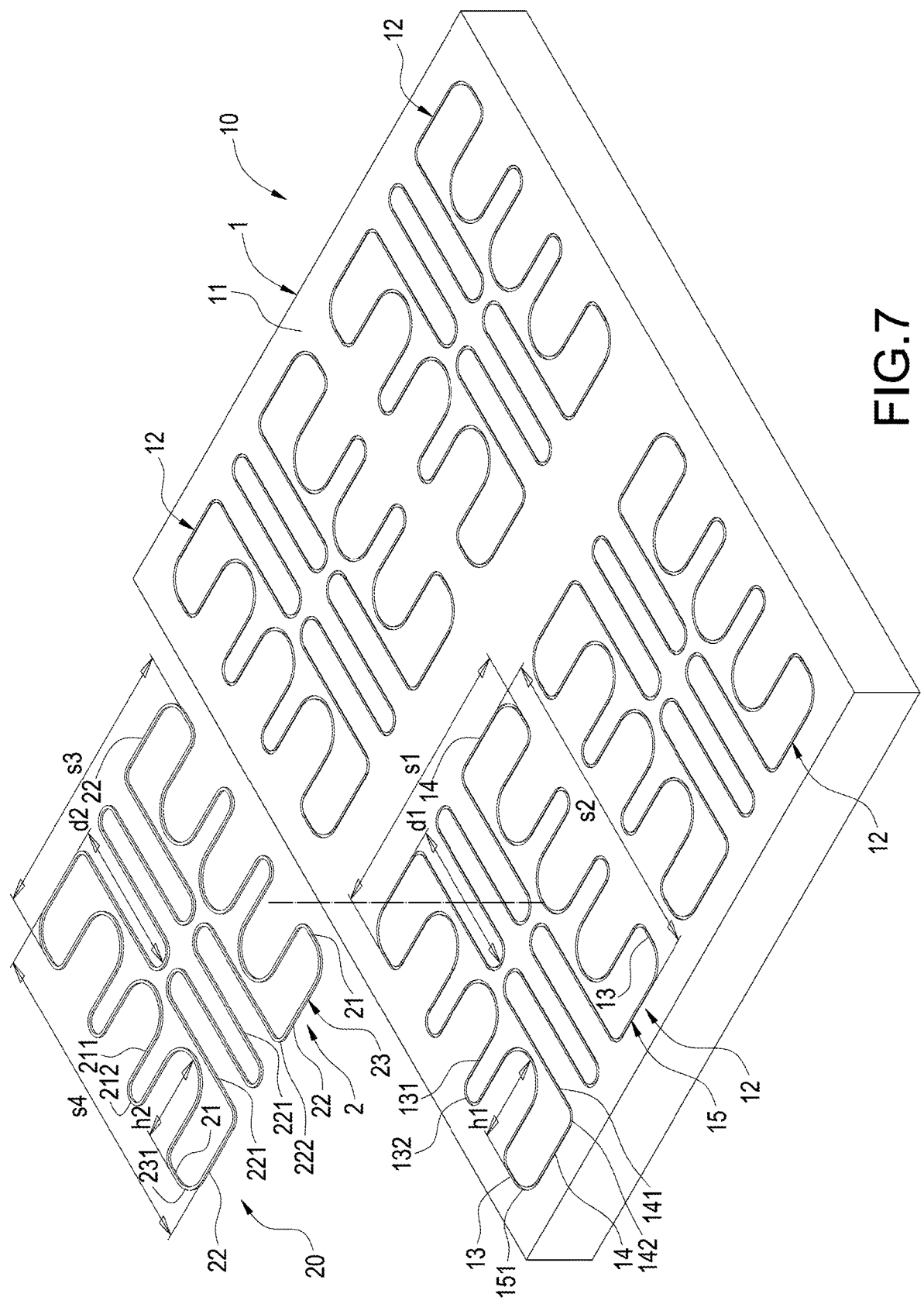
FIG. 7 is a schematic view of removing a waterproof gasket structure from a gasket shaping mold in accordance with a fourth embodiment of this disclosure.

With reference to FIG. 7 for a gasket shaping mold 10 and a waterproof gasket structure 20 in accordance with the fourth embodiment of this disclosure, the fourth embodiment is substantially the same as the first embodiment, except that there are plural concavely bent portions 141 of each transverse groove section 14 in the fourth embodiment, and the gasket body 2 is manufactured by casting from a single mold cavity ring-groove 12, so that the quantity of inwardly concavely bent sections 221 of each transverse side strip 22 is plural, and the middle of the gasket body 1 and the mold cavity ring-groove 12 can be utilized effectively. Therefore, the gasket body 2 of the fourth embodiment and the gasket body 2 of the first embodiment are just different in shape, length, and size, and the fourth embodiment has the same functions and effects of the first embodiment.

In summation of the description above, the waterproof gasket structure and its gasket shaping mold of this disclosure are novel, useful, non-obvious, and inventive and comply with the patent application requirements, and thus the disclosure is duly filed for patent application.

While this disclosure has been described by means of specific embodiments, numerous modifications and variations could be made thereto by those skilled in the art without departing from the scope and spirit of this disclosure set forth in the claims.

What is claimed is:

1. A gasket shaping mold, comprising:
    a. a mold seat having a surface,
    b. a plurality of mold cavity ring-grooves concavely formed on the surface, and
    c. each of the mold cavity ring-grooves having two longitudinal groove sections configured to be opposite to each other, and
    d. at least one of the longitudinal groove sections having at least an inwardly bent wavy bent portion, and
    e. a plurality of turning round corner portions formed at a junction between the longitudinal groove section and the wavy bent portion, and
    f. each of the turning round corner portions having a radius equal to or greater than 6 mm;
    g. wherein the wavy bent portion is in a shape of a U-shaped wave or a flat u-shaped wave;
    h. wherein each of the mold cavity ring-grooves is a polygonal ring-groove, and a corner end of the polygonal ring-groove has a plurality of corner-end round corner portions formed thereon, and each of the corner-end round corner portions has a radius equal to or greater than 6 mm.

2. The gasket shaping mold of claim 1, wherein the wavy bent portion has a wave height greater than one-quarter of a separation distance of the two longitudinal groove sections.

3. The gasket shaping mold of claim 1, wherein there is only one longitudinal groove section having the wavy bent portion, and the wavy bent portion has a wave height greater than two-thirds of a separation distance of the two longitudinal groove sections.

4. The gasket shaping mold of claim 1, wherein there are two longitudinal groove sections having the wavy bent portion, and each of the wavy bent portions has a wave height greater than one-third of a separation distance of the two longitudinal groove sections.

5. The gasket shaping mold of claim 1, wherein there are two longitudinal groove sections having the wavy bent portion, and each of the mold cavity ring-grooves has two transverse groove sections formed and spanned across the two longitudinal groove sections and configured to be opposite to each other, and each of the transverse groove sections has at least a concavely bent portion disposed between the two wavy bent portions, and a plurality of bent round corner portions formed at a junction between the transverse groove section and the concavely bent portion, and each of the bent round corner portions has a radius equal to or greater than 6 mm.

6. The gasket shaping mold of claim 5, wherein the concavely bent portion has a depth greater than one-third of a separation distance of the two transverse groove sections.

7. The gasket shaping mold of claim 5, wherein the concavely bent portion is U-shaped, or flat u-shaped.

* * * * *